Oct. 7, 1941.   B. M. BODDE   2,257,999
TRANSLUCENT PICTURE PROJECTION SCREEN AND MANUFACTURE THEREOF
Filed Aug. 20, 1938
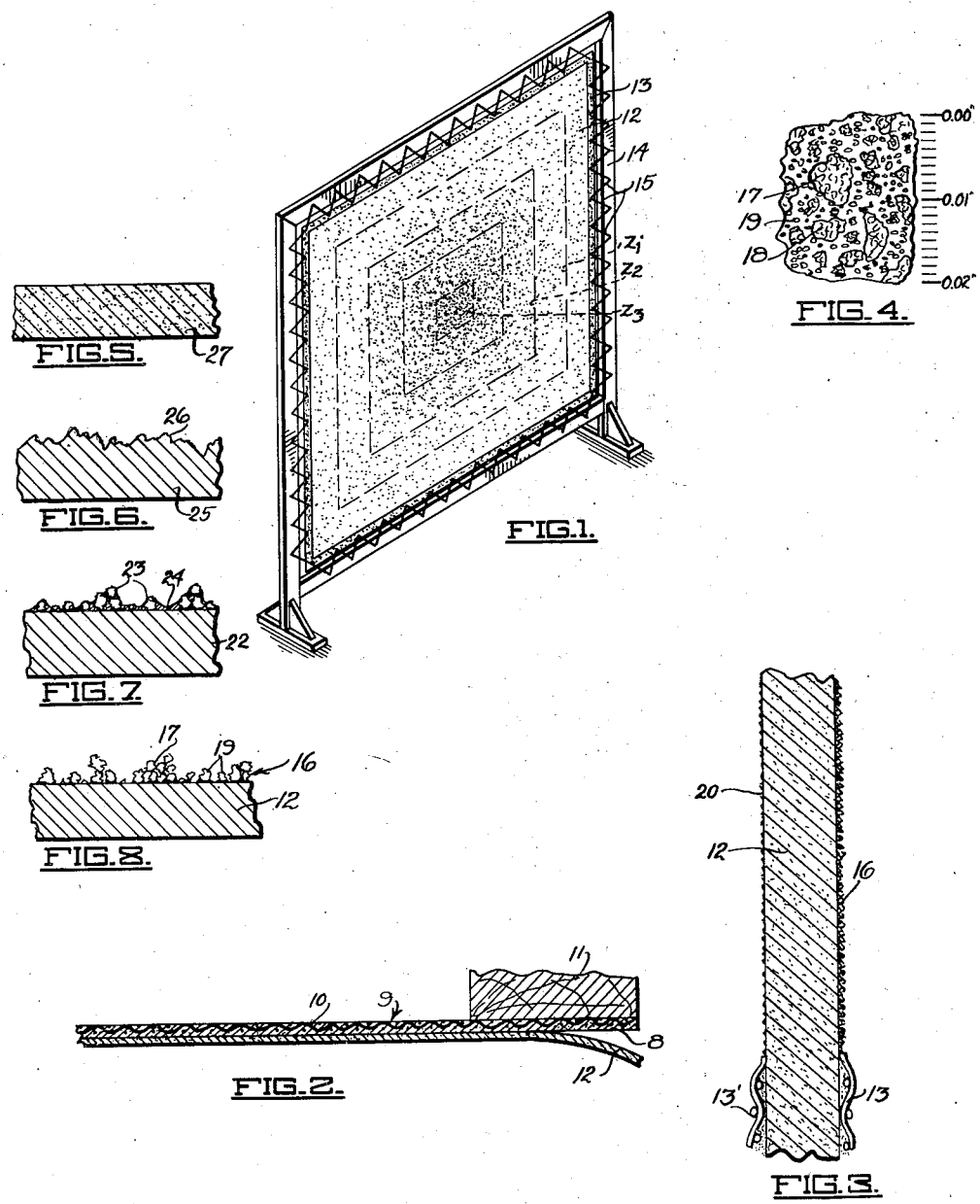
INVENTOR.
BERNARD M. BODDE
BY
ATTORNEY.

Patented Oct. 7, 1941

2,257,999

UNITED STATES PATENT OFFICE 2,257,999

TRANSLUCENT PICTURE PROJECTION SCREEN AND MANUFACTURE THEREOF

Bernard M. Bodde, Hollywood, Calif.

Application August 20, 1938, Serial No. 225,973

16 Claims. (Cl. 91—68)

This invention relates to translucent picture projection screens and method of making the same.

Screens of the above type are employed to receive pictures projected thereon by a suitable projector on one side of the screen while permitting an audience to view that projected picture, or a camera to photograph the same, on the opposite side of the screen.

One object of the prevent invention is to facilitate the manufacture of translucent screens.

Another object of the invention is to reduce the cost of manufacture of a translucent screen.

Another object of the present invention is to obtain a high picture transmission on a screen while retaining a high degree of translucency.

A still further object of the invention is to form a secure bond between a screen base and a translucent layer thereon.

The invention contemplates the use of a screen base of light transmitting material, preferably flexible and transparent, upon which a translucent layer is formed. The material forming the translucent layer is dissolved in a solvent miscible with the material of the screen base and is applied to the base in the form of a spray under pressure, and the pressure, the distance between the spraying nozzle and the base, the volatility of the solvent, and the viscosity of the solution are controlled to cause the various particles forming the spray to solidify sufficiently to prevent their complete coalescence with the base and with each other when impinging on the surface of the base, whereby a rough light refracting surface is formed. At the same time the spraying pressure, etc., is controlled to permit the solvent in the spraying solution to form a secure bond between the partially solidified particles and the screen base or, in other words, to permit partial coalescence between the various particles and the base and each other.

Preferably the same material, whether of cellulose or synthetic resin material, is used in the screen base as in the translucent layer and that material is treated so as to assume two radically different forms, namely, it is sprayed (preferably without the addition of a light diffusing agent) so that the particles coalesce to form a transparent homogeneous flexible base and thereafter the same material is sprayed under different conditions to prevent complete coalescence of the particles of the spray to form a rough light refracting translucent surface on the base.

The manner in which the above and other objects of the invention are accomplished will be readily understood on reference to the following specification read in conjunction with the accompanying drawing wherein:

Fig. 1 is a perspective view of a completed translucent screen embodying my invention.

Fig. 2 is a sectional view through a portion of a matrix and a transparent screen base formed thereon.

Fig. 3 is an enlarged fragmentary cross sectional view through the completed translucent screen.

Fig. 4 is a view showing a highly magnified portion of the translucent layer of the screen.

Figs. 5 to 7, inclusive, are views showing highly magnified cross sections of translucent screens of the prior art.

Fig. 8 is a view showing a highly magnified cross section of a translucent screen embodying my invention.

In employing relatively large screens, that is, over eight feet in width and ten feet in length, it is necessary to provide a considerable amount of tension between the edges of the screen and the frame in which the screen is suspended to maintain the screen flat and taut. I provide a screen sufficiently strong to withstand this tension without employing wires, fabric or other strengthening material in the body portion of the screen by using a flexible transparent base of plastic material of a thickness to give sufficient strength, while providing on one or both surfaces thereof a thin layer of translucent material. Thus, I obtain the desired translucency of the screen substantially independently of the thickness of the screen, such thickness being governed wholly by the necessary strength requirements for the screen. Furthermore, since the base is employed merely as a transparent support for the translucent layer thereon, the translucent layer because of its thinness offers a minimum of impedance to the light.

Referring to Fig. 2, a horizontal matrix 9 is formed of a fabric 10 suitably secured in a taut condition in a frame, a portion of which is shown at 11. A plastic base 8 is applied to the under surface of the fabric 10, to form a smooth surface onto which the transparent screen base 12 may be sprayed. This plastic base 8 is formed of a suitable material, such as an amber composition, which is non-compatible with the solution employed for making the screen base 12.

By way of example, the material used to form the screen base 12 is of cellulose acetate base. Acetated cotton or cellulose acetate is dissolved in a volatile solvent, such as acetone, to render it sprayable upon the under surface of the matrix 9. Plasticizers and evaporation retarding agents are added to the cellulose acetate solution in amounts necessary to produce a flexible, transparent, lasting screen base. A satisfactory formula for the above mentioned cellulose acetate solution is found in the patent to F. W. Jackman, No. 2,071,342, issued February 23, 1937, although other formulas may be used. The liquid solution, thus formed, is sprayed under pressure upon the under surface of the matrix 9 in the form of plurality of superimposed coats while permitting each coat to dry before applying the next succeeding coat. This spraying operation may be performed manually using a suitable spraying apparatus similar to that used for spraying paint and the like. By spraying the cellulose acetate solution upwardly onto the under surface of the matrix 9, as disclosed and claimed in my copending application Serial No. 212,010, filed June 6, 1938, for "Manufacture of translucent screens," any dirt or water vapor from the spray equipment or elsewhere will tend to settle downward, away from the sprayed material, i. e. cellulose, synthetic resin, or the like.

During the spraying operation, the spraying pressure and the distance between the spraying nozzle and the matrix 9 is so regulated that the particles of the spray coalesce on reaching the screen, and thus form a flexible, homogeneous, transparent sheet having a smooth outer surface, which screen may be built up to any desired thickness dependent upon the number of coats applied to the matrix 9. However, I prefer to make the screen from .015" to .030" in thickness, dependent upon the area of the screen and the amount of tension applied to the edges thereof to retain the same taut. Also, the base 12 may be of substantially the same thickness throughout the area thereof or it may slightly increase toward the edges thereof to strengthen those portions. However, in any event, it is to be understood that the thickness of the screen base is not used to change the light transmission therethrough and, because of this, I prefer to make the base 12, as transparent as possible.

After the base 12, has reached the desired thickness, it is allowed to thoroughly dry, and is then stripped from the matrix 9. Fabric strips 13 and 13' (Figs. 1 and 3) are suitably secured along the edges of the base 12 on opposite sides thereof and the base 12 is then suspended in a rectangular frame 14 by interlaced elastic cords 15. The cords 15 are secured between the edge of the screen base and points on the frame 14 under tension to maintain the screen base 13 in a flat and taut condition throughout the area thereof.

The material employed for forming the translucent layer 16 on the surface of the base 12 is dissolved in a solvent which is miscible with the material forming the base 12. Preferably, I employ the same material, i. e. cellulose acetate, dissolved in the same solvent, i. e. acetone, for producing the translucent layer 16 and for producing the base 12. However, any other substantially transparent material dissolved in any other suitable volatile solvent may be employed for producing the translucent layer 16, provided such solvent is miscible with the base 12, and further providing that when atomized the particles of the solution thus formed are capable of partially solidifying before striking the base 12.

Assuming the base has been made of cellulose acetate material, a preferred spraying solution for forming the translucent layer 16 is as follows. I dissolve one-eighth pound of cellulose acetate in one gallon of acetone and other solvents and plasticizers well known in the art. This solution is about four times thinner than the solution for forming the base. In this solution I may add, if desired, a tablespoon of zinc stearate to reduce the sheen formed on the translucent layer 16.

The above mentioned spraying solution is placed in a spraying apparatus, such as that employed for spraying the base 12, and is sprayed onto one surface of the base 12. During this spraying operation, the spraying pressure and the distance of the spraying nozzle from the surface of the base 12, are so regulated in relation to the volatility of the solvent and the concentration of the spraying solution that the atomized particles of the spraying solution partially solidify before they reach the surface of the base 12, thus forming an array of minute white projections on the base as at 17, 18 and 19 (Figs. 4 and 8). The spraying pressure and spraying distance, however, are so controlled that enough of the solvent remains in the various particles on reaching the screen base 12 so as to provide a bond between such particles and the base.

In the event that the above described proportions are used for the spraying solution for the translucent layer 16, I have found that the best results are obtained when the spraying nozzle is held approximately thirty inches from the surface of the base 12, and when the spraying pressure is maintained at approximately one hundred pounds per square inch. I have also found that where solvents of less volatility are used the distance between the spraying nozzle and the surface of the base 12 must be increased to obtain best results.

The density of distribution of the various particles forming the translucent layer 16, is preferably made greater at the center of the screen while gradually decreasing toward the edges of the screen to reduce the "hot spot" effect of a picture projected thereon due to the well known inherent defects of present day optical systems in picture projectors. This is accomplished by applying more coats of the spraying material at the center than at the edges. For example, on an 18' x 20' screen about fifteen coats of the spraying material are uniformly applied over the entire surface of the screen base 12. Several more coats are then applied over a smaller central area or zone, as defined by the dotted lines $Z_1$. Thereafter about an equal number of more coats of the spraying solution are applied to a still smaller central area or zone $Z_2$. This procedure is continued until a small zone $Z_3$ in the center of the screen is reached, in which an aggregate of one hundred and fifty coats will be provided. However, these various coats will be of substantially microscopic thickness as will be described hereinafter. These various zones $Z_1$, $Z_2$, $Z_3$, etc., gradually blend together so as to form a final translucent coat whose density of distribution of the particles formed on the base 12 gradually increases toward the center of the screen. This method of reducing "hot spot" effect as well as a screen thus produced are disclosed and claimed in my co-pending application Serial No. 51,299, filed November 22, 1935, for "Manufacture of translucent screens," and Patent No. 2,133,076, issued Oct. 11, 1938, for "Translucent projection screens," respectively. Also, the method of first forming a transparent base and thereafter rendering one surface thereof translucent is broadly claimed in my aforementioned co-pending application Serial No. 51,299. Due to piling up or clustering of the various partly solidified particles, as they are sprayed onto the screen base, these various particles or projections will be found to vary in size especially toward the center of the screen.

Due to the above mentioned piling up of the various particles in the spraying operation, the projections thus formed will be found to vary considerably in size, ranging from approximately .0005" to approximately .010" in size as shown in the magnified view in Fig. 4. Furthermore, it is found that the space between various large particles as at 17 and 18 is filled with smaller particles as at 19, these various small particles apparently being formed by separate atomized particles in the spray while the large particles as at 17 and 18 are apparently formed by a number of smaller particles which pile up on one another either at the surface of the screen base 12 or during their travel from the nozzle of the spraying apparatus to the surface of base 12.

From the appearance of my screen as viewed through a microscope as well as from a consideration of the method of forming the same, the screen appears to take the form illustrated in Fig. 8 wherein the various particles 19 forming the translucent layer 16 substantially retain their original shape into which they solidified during their travel through the air from the spraying nozzle to the surface of the sheet 12. In other words, since these various particles 19 have partially solidified during their travel through the air they only partially coalesce with the base 12 and with each other to remain discreet in themselves. Thus, the various discreet minute particles 19 are seen to present refracting surfaces on all sides thereof except those sides or portions directly in contact with the surface of the sheet 12 or in contact with each other, thereby providing a maximum amount of translucency and at the same time a maximum amount of light transmission.

In contrast with my present improved form of screen, Fig. 7 illustrates a translucent screen formation of the prior art which is disclosed and claimed in my above mentioned Patent No. 2,133,076. In this case a transparent smooth screen base 22 of cellulose acetate is first formed onto which an array of quartz particles 23 suspended in a liquid cellulose acetate solution is sprayed. When these quartz particles reach the screen base 22 the cellulose acetate solution surrounding each particle being compatible with the base 22, is drawn thereto by surface tension thus permitting the outer points of the quartz particles 23 to protrude while forming a layer 24 in which the quartz particles are embedded. Due to this surface tension the surface of the cellulose acetate layer 24 apparently forms smooth surfaced valleys between the adjacent particles. Although this type of screen formation is satisfactory, it will be noted that the layer 16 of Fig. 8 provides a much greater amount of refracting surfaces.

Fig. 6 illustrates another form of prior art screen formation, the method of making the same being disclosed and claimed in the patent to F. W. Jackman No. 2,071,344, issued February 23, 1937, for "Method of making a translucent picture projection screen." In this case a translucent picture projection screen is formed in one operation by spraying a liquid cellulose acetate solution upon a sandblasted matrix and stripping the sheet thus formed from the matrix. The sheet 25 when stripped is found to have a rough translucent surface 26 thereon exactly complementary to the sandblasted surface of the matrix. This screen, while satisfactory for picture projection, is found to present fewer minute light refracting surfaces than the translucent layer 16 of my improved screen shown in Fig. 8.

Fig. 5 shows still another form of prior art screen wherein the body portion 27 thereof has incorporated therein a light diffusing agent to impart translucency thereto. This type of screen has the disadvantage that it greatly reduces the intensity of the light passing therethrough.

In order to prevent "back glare," or reflection from the rear of the screen due to the sheen of the smooth surface, one or more coatings 20 of the same spraying material as used for the layer 16 may be applied thereto.

I claim:

1. The method of making a translucent picture projection screen which comprises spraying a solution of screen material dissolved in a volatile solvent onto a matrix while sufficiently preventing evaporation of said solvent during said spraying to form a homogeneous light transmitting sheet and thereafter spraying a solution of said material on said sheet while causing a sufficient amount of said last mentioned solvent to evaporate during said last mentioned spraying to form a translucent layer of light refracting projections of discrete particles of said material on said sheet.

2. The method of making a translucent picture projection screen which comprises spraying a solution of screen material dissolved in a volatile solvent onto a matrix while sufficiently preventing evaporation of said solvent during said spraying to form a homogeneous light transmitting sheet, allowing said sheet to dry, and thereafter spraying a solution of said material dissolved in the same solvent on said sheet while causing a sufficient amount of said last mentioned solvent to evaporate during said last mentioned spraying to form a translucent layer of light refracting projections of discrete particles of said material on said sheet.

3. The method of making a translucent picture projecting screen which comprises forming screen material into a homogeneous light transmitting sheet, and thereafter spraying a solution of said screen material dissolved in a volatile solvent onto said sheet while causing a sufficient amount of said solvent to evaporate during said spraying to form a discontinuous layer of light refracting projections of discrete particles of said material on said sheet.

4. The method of making a translucent picture projection screen which comprises forming screen material into a homogeneous light transmitting sheet and thereafter spraying a solution of said screen material dissolved in a volatile solvent onto said sheet, and causing a sufficient amount of said solvent to evaporate during said spraying to form a translucent layer of light refracting projections of discrete particles of said material on said sheet while sufficiently preventing evaporation of said solvent during said spraying, thereby forming a secure bond between said particles and said sheet.

5. The method of making a translucent picture projection screen which comprises spraying a liquid solution of screen material to the surface of a matrix to form a smooth homogeneous sheet, allowing said sheet to dry, and thereafter applying a liquid solution of said screen material to the surface of said sheet in the form of a spray while causing the particles in said spray to partially solidify before reaching said sheet, thereby forming a rough translucent layer of a piling of discrete particles.

6. The method of making a translucent picture projection screen which comprises producing a sheet of light transmitting material and spraying on said sheet a solution of light transmitting material dissolved in a solvent miscible with said sheet causing a sufficient amount of said solvent to evaporate during said spraying to form a rough translucent surface of a piling of discrete particles of said last mentioned material bonded to said sheet.

7. The method of making a translucent picture projection screen which comprises forming a sheet of light transmitting material and spraying a solution of light transmitting material dissolved in a volatile solvent miscible with said sheet onto said sheet under pressure, and controlling the spraying distance, the spraying pressure, the volatility of said solvent, and the viscosity of said solution to cause the particles in said spray to form a translucent layer of rough discrete particles of said last mentioned material on said sheet.

8. The method of making a translucent picture projection screen which comprises forming a sheet of light transmitting material and directing an atomized solution of light transmitting material dissolved in a volatile solvent miscible with said sheet onto said sheet, and causing particles of said atomized solution to partially solidify before contacting said sheet, while bonding to said sheet without coalescing therewith completely.

9. The method of making a translucent picture projecting screen which comprises spraying a solution of light transmitting material onto a matrix while controlling said spraying to cause said material to coalesce on said matrix whereby to form a light transmitting sheet, allowing said sheet to solidify, and thereafter spraying a solution of light transmitting material dissolved in a solvent miscible with said sheet onto said sheet while controlling said last mentioned spraying to permit only partial coalescing of said last mentioned material on said sheet.

10. The method of making a translucent picture projection screen which comprises spraying a transparent solution of screen material onto a matrix to form a homogeneous transparent sheet, allowing said sheet to dry, stripping said sheet from said matrix and spraying a solution of said material onto said sheet to form a rough translucent layer of a piling of discrete particles of said material.

11. The method of making a translucent picture projection screen according to claim 10 which comprises rendering said last mentioned solution substantially thinner than said first mentioned solution.

12. The method of making a picture projection screen which comprises spraying a solution of screen material dissolved in a solvent onto a matrix to form a transparent sheet, allowing said sheet to dry, stripping said sheet from said matrix, spraying a solution of said screen material dissolved in a solvent onto one surface of said sheet under pressure, said last mentioned solution being more dilute than said first mentioned solution, and controlling said spraying pressure, the spraying distance, the volatility of said last mentioned solvent and the concentration of said last mentioned solution whereby to form a rough translucent layer of discrete particles of said material on said sheet.

13. The method of making a picture projection screen in accordance with claim 12 which comprises incorporating a glare reducing agent into said last mentioned solution.

14. The method of forming a translucent picture projector screen by forming a translucent surface on a transparent sheet which comprises spraying on said sheet a solution of a material dissolved in a solvent, said solution being capable of forming transparent matter on solidifying under certain conditions, and correlating the spraying pressure, the spraying distance, the volatility of said solvent, and the concentration of said solution to form a rough translucent layer of a piling of discrete particles of said material on said sheet.

15. A translucent picture projection screen comprising a base of transparent material, a translucent surface on said base and comprising an array of rough discrete particles of plastic material bonded to said base and to each other.

16. A translucent picture projection screen comprising a transparent body portion, and a translucent surface thereon comprising superimposed layers of finely divided particles of substantially the same material as said body portion with an admixture of glare reducing agent, said particles being bonded throughout a portion only of their surfaces to said body portion and each other and providing a rough surface.

BERNARD M. BODDE.